United States Patent
Gray et al.

(10) Patent No.: US 8,423,717 B2
(45) Date of Patent: Apr. 16, 2013

(54) MULTI-CORE PROCESSING CACHE IMAGE MANAGEMENT

(75) Inventors: Scott Gray, Peoria, AZ (US); Nicholas Wilt, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 500 days.

(21) Appl. No.: 12/629,325

(22) Filed: Dec. 2, 2009

(65) Prior Publication Data

US 2011/0131377 A1    Jun. 2, 2011

(51) Int. Cl.
*G06F 12/00* (2006.01)

(52) U.S. Cl.
USPC ............ 711/130; 711/122; 711/129; 711/131

(58) Field of Classification Search ........................ None
See application file for complete search history.

(56) References Cited

U.S. PATENT DOCUMENTS

| | | | |
|---|---|---|---|
| 5,381,539 A | 1/1995 | Yanai et al. | |
| 5,895,487 A | 4/1999 | Boyd et al. | |
| 6,745,292 B1 | 6/2004 | Stevens | |
| 6,976,131 B2 | 12/2005 | Pentkovski et al. | |
| 2010/0199280 A1* | 8/2010 | Vestal et al. | 718/102 |

FOREIGN PATENT DOCUMENTS

WO    2009107048    9/2009

OTHER PUBLICATIONS

Berg, Thomas, "Maintaining I/O Data Coherence in Embedded Multicore Systems", "IEEE Micro", May/Jun. 2009, pp. 10-19, Publisher: IEEE Computer Society.
Chang et al., "Cooperative Caching for Chip Multiprocessors", Apr. 19, 2006, Publisher: Computer Science Department, University of Wisconsin-Madison.
Li et al., "Parallelization, Performance Analysis, and Algorithm Consideration of Hough Transform on Chip Multiprocessors", "Microprocessor Technology Lab", Dec. 2007, Publisher: Intel Corporation.

* cited by examiner

*Primary Examiner* — Shawn X Gu
(74) *Attorney, Agent, or Firm* — Fogg & Powers LLC

(57) ABSTRACT

A multi-core processor chip comprises at least one shared cache having a plurality of ports and a plurality of address spaces and a plurality of processor cores. Each processor core is coupled to one of the plurality of ports such that each processor core is able to access the at least one shared cache simultaneously with another of the plurality of processor cores. Each processor core is assigned one of a unique application or a unique application task and the multi-core processor is operable to execute a partitioning operating system that temporally and spatially isolates each unique application and each unique application task such that each of the plurality of processor cores does not attempt to write to the same address space of the at least one shared cache at the same time as another of the plurality of processor cores.

20 Claims, 5 Drawing Sheets

MULTI-CORE PROCESSING CACHE IMAGE MANAGEMENT

BACKGROUND

Typical multi-core processors need to manage cache and cache coherency for each of the processing cores. Cache coherency is often managed by using a plurality of caches and tying each cache to a particular processing core. In other systems, a shared cache is used. In typical multi-core processors with a shared cache, access to the shared cache is arbitrated. These methods may be effective for applications in which the executed code and data sets are independent for each processor core. However, for applications in which the code space (e.g. operating system, I/O routines, algorithms, etc.) is common and/or the data set is shared, independent caches requires cache coherency algorithms that can significantly reduce bandwidth and make the cache areas ineffective since redundant information is stored in multiple caches. In addition, when a single cache is arbitrated between multiple processor cores, the bandwidth to the cache for a given processor core is reduced by the actions of the other processor cores.

SUMMARY

In one embodiment, a multi-core processor chip is provided. The multi-core processor chip comprises at least one shared cache having a plurality of ports and a plurality of address spaces and a plurality of processor cores. Each processor core is coupled to one of the plurality of ports such that each processor core is able to access the at least one shared cache simultaneously with another of the plurality of processor cores. Each processor core is assigned one of a unique application or a unique application task and the multi-core processor is operable to execute a partitioning operating system that temporally and spatially isolates each unique application and each unique application task such that each of the plurality of processor cores does not attempt to write to the same address space of the at least one shared cache at the same time as another of the plurality of processor cores.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. The following detailed description is, therefore, not to be taken in a limiting sense.

The embodiments described below implement a partitioning operating system (OS) on a multi-processor core to manage a shared cache. A partitioning operating system is an operating system which isolates each running application both temporally and spatially. Exemplary partitioning operating systems include, but are not limited to, ARINC 653 compliant operating systems, such as LynxOS-178, VxWorks 653, INTEGRITY-178B, and PikeOS. Other appropriate partitioning operating systems, such as non-ARINC 653 compliant operating systems, are known to one of skill in the art and can be used in other embodiments.

Figure 1:
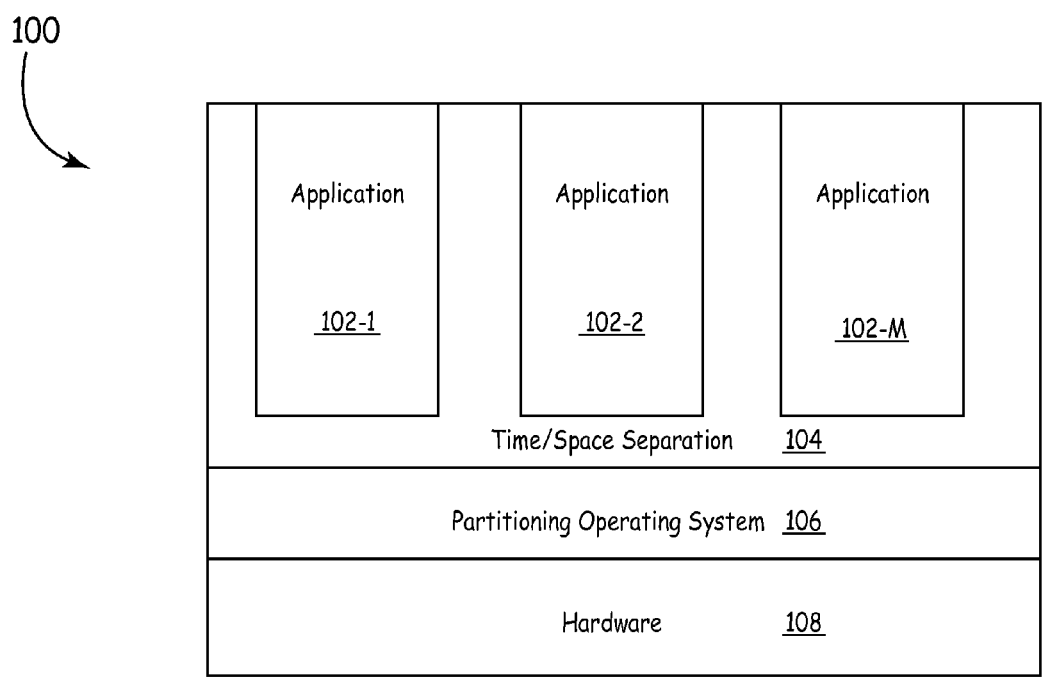
FIG. 1 is a high-level block diagram depicting the architecture for a partitioning operating system.

FIG. 1 is a high-level block diagram depicting an exemplary architecture 100 for a partitioning operating system 106. It is to be understood that architecture 100 is provided by way of example and not by way of limitation. In particular, it is to be understood that other elements not shown, such as a board support package and application programming interfaces (API), can also be included.

The architecture 100 includes hardware, such as a processor and cache, on which the partitioning operating system 106 is run. The partitioning operating system 106 isolates each of a plurality of running applications 102-1 . . . 102-M with a time/space separation 104. That is, only one of the plurality of applications 102-1 . . . 102-M is allowed write access to a given address space in the cache at a given time. For example, if application 102-1 is writing to a particular address space, applications 102-2 . . . 102-M are not given read or write access to that particular address space. However, at another moment in time, one of applications 102-2 . . . 102-M can be given read or write access to that particular address space. In addition, more than one of the applications 102-1 . . . 102-M can be given read access to an address space as long as no other application has concurrent write access to the same address space. Thus, the applications are isolated temporally and spatially such that one of the applications 102-1 . . . 102-M does not interfere with the other applications.

Figure 2:
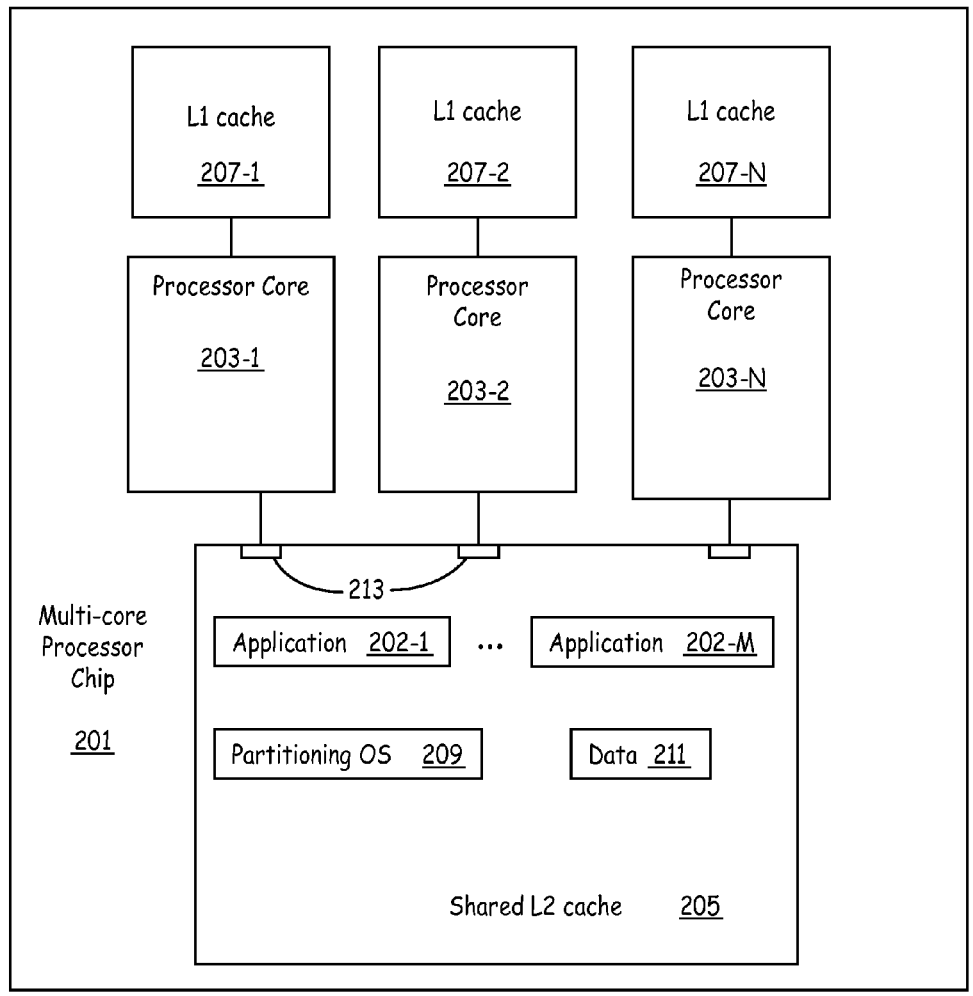
FIG. 2 is a block diagram of one embodiment of a multi-processor core.

FIG. 2 is a block diagram of a multi-core processor chip 201 which leverages the architecture of a partitioning operating system to manage a shared cache 205. The multi-core processor chip 201 can be implemented as a single integrated circuit die or as a single chip package having multiple dies, as known to one of skill in the art.

In the example of FIG. 2, each of the plurality of processor cores 203-1 . . . 203-N is associated with a corresponding independent level 1 (L1) cache 207-1 . . . 207-N. It is to be understood that the L1 cache can include separate instruction cache (i-cache) and data cache (d-cache), as known to one of skill in the art. Each of the plurality of processor cores 203-1 . . . 203-N also has access to an N-ported level 2 (L2) cache 205. The term "N-ported" means that each of the N processor cores 203 has a dedicated port 213 to the cache and can have simultaneous access to the shared L2 cache 205.

A partitioning operating system 209 is loaded into the shared L2 cache 205 from a main memory external to the multi-core processor chip 201. In addition, executable code of the partitioning operating system 209 can be loaded into the L1 cache 207 of each corresponding core 203 as well. The plurality of processor cores 203-1 . . . 203-N execute the partitioning operating system 209 and other executable code in the common code space. As used herein, a shared common code space refers to executable code that can be accessed by each of the plurality of processor cores 203, such as, but not limited to, an operating system, I/O routines, algorithms, etc. For example, one or more applications 202-1 . . . 202-M are executed or run by each of the processor cores 203-1 . . . 203-N. The multi-core processor chip 201 can be configured to operate in asymmetric or symmetric multi-processing. In asymmetric multi-processing, the applications 202 that are executed by each core 203 are different from the applications 202 executed by other cores 203. In symmetric multi-processing, the applications 202 run by two or more cores 203 can be the same. However, in this example, even if the same applications are run by a plurality of cores 203, each instance of the application is scheduled to be performing a different task. Enforcement of the task scheduling is handled by the partitioning operating system 209.

As described above, the partitioning operating system 209 isolates the plurality of applications 202 temporally and spatially to prevent more than one application from writing to the same address space at the same time. Assigning unique applications or unique tasks to each core 203 helps ensure that no two cores 203 attempt to write to the same address space at the same time. A unique application, as used herein, refers to an application which is only executed by one of the plurality of cores 203. Similarly, a unique task refers to an application task which is executed by only one of the plurality of cores 203. Since the partitioning operating system 209 prevents multiple applications or tasks from writing to the same address space at the same time, no two cores 203, which execute unique applications, are able to write to the same address space at the same time.

In addition, the executable code of the partitioning operating system 209 and the applications 202 is not self-modifying code. In other words, the processor cores 203 only have read access to the executable code. In addition, the multiple processor cores 203 share common code. The ability to have concurrent read access is advantageous for sharing common code between the multiple processor cores 203. Thus, each core 203 has the ability to simultaneously access a shared common code space without coherency algorithms or arbitration. For example, the multiple processor cores 203 can simultaneously access and execute common routines from libraries, such as Operating System libraries, I/O interface drivers, etc.

Indeed, by assigning different applications 202 or different tasks to different cores 203, the multi-core processor chip 201 leverages the isolation and scheduling capabilities of the partitioning operating system 209 to manage access to the shared L2 cache 205 without the coherency or arbitration algorithms that are used in typical multi-core processor chips. Thus, each core 203 can access the data 211 and executable code (e.g. partitioning operating system 209 and applications 202) in the N-ported cache 205 while increasing the bandwidth available for each core 203 as compared to typical multi-core processor chips. In addition, each core 203 is not subject to hard limitations in accessing the cache 205, such as limits to a specific assigned region of the cache 205. Rather, each core 203 has read and write access to the cache 205 controlled via its respective MMU and system configuration without such hard limitations. By managing write privileges through each processor core's respective MMU, a performance benefit is obtained. In particular, a table look-up typically performed by a cache controller to manage write privileges in typical multi-processor cores is avoided by managing write access through the respective MMUs.

Thus, the cores 203 are able to operate independently such that the actions of one core 203 do not interfere with the actions of another core 203. This increases bandwidth by eliminating the need for arbitrating access to the shared L2 cache 205. In addition, since the processor cores 203 share the larger L2 cache 205, a benefit in the area used on the multi-processor chip 201 is obtained. In particular, rather than having multiple smaller caches, a single larger cache can be used with data and executable code, such as the partitioning operating system and system drivers, are located in place in the cache. Since access to the shared L2 cache 205 is not arbitrated, any performance impact on the multiple cores by having a shared cache is reduced.

Figure 3:
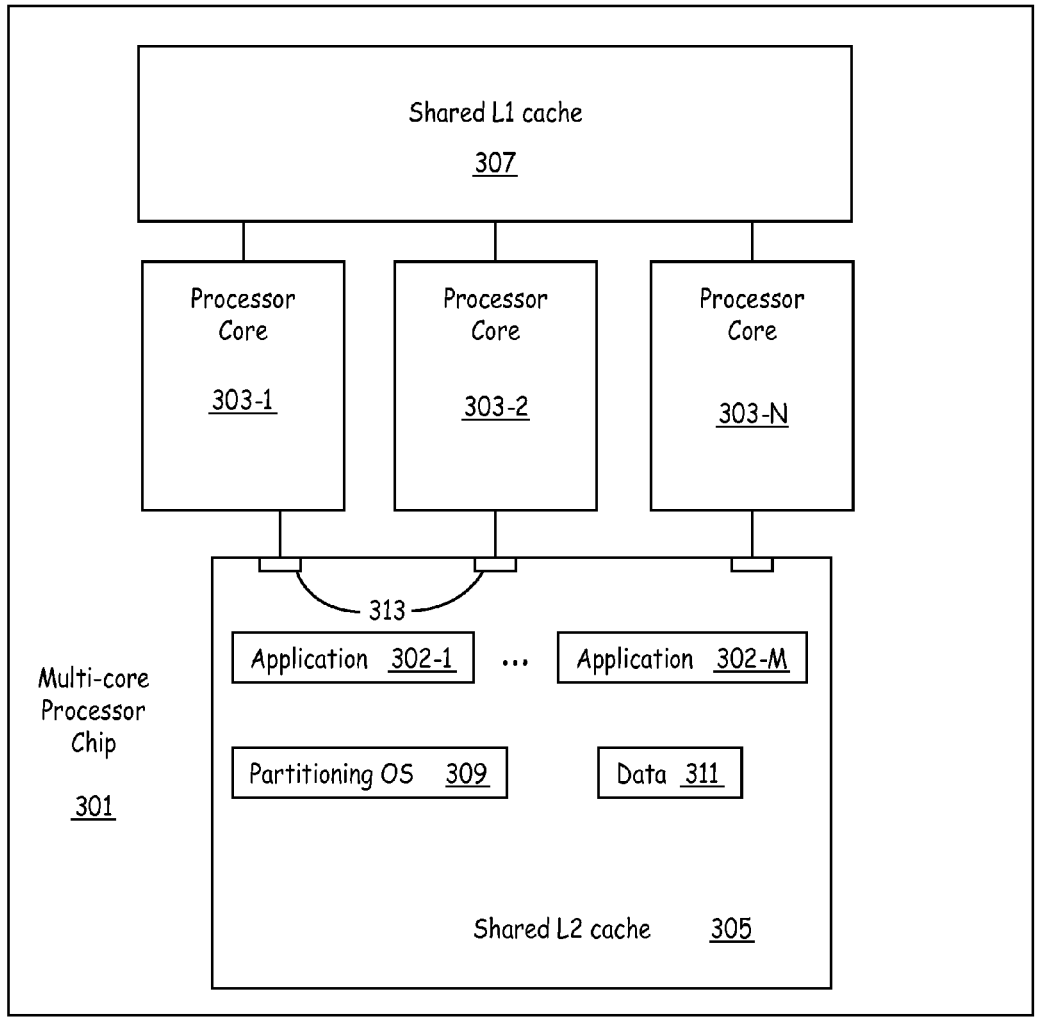
FIG. 3 is a block diagram of another embodiment of a multi-processor core.

It should be noted that although the L2 cache 205 is shared in this example, the L1 cache 207 can be shared in other implementations, as is shown in the example in FIG. 3. The multi-core processor chip 301 is similar to the multi-core processor chip 201. However, the L1 cache 307 and the L2 cache 305 are both shared in the example of FIG. 3. In addition, a level 3 (L3) cache, not shown, can also be shared by a plurality of cores in other implementations.

Figure 4:
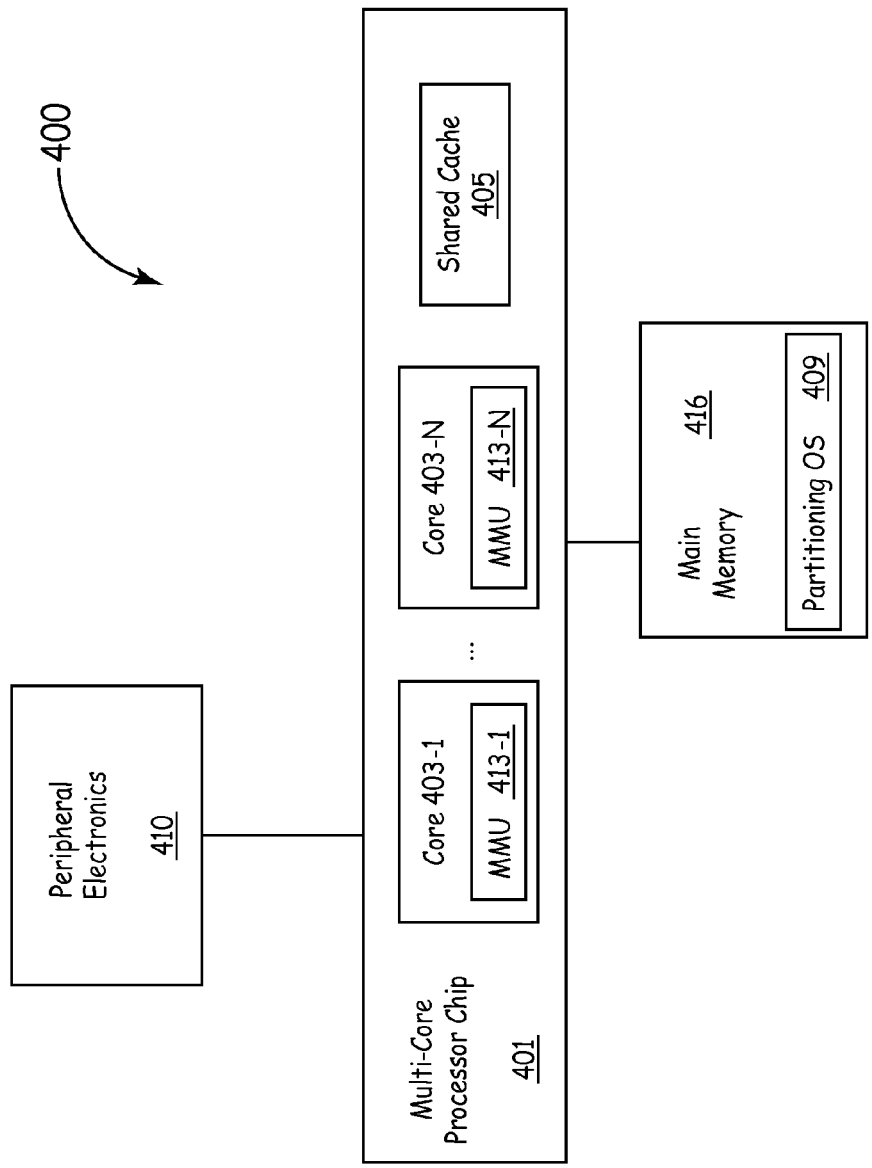
FIG. 4 is a block diagram of one embodiment of a system implementing a multi-processor core.

FIG. 4 is a block diagram of a system 400 which implements one embodiment of a multi-core processor chip 401. The system 400 includes the multi-core processor chip 401, one or more peripheral electronics 410, and a main memory 416, each coupled to the multi-core processor chip 401. The particular peripheral electronics 410 used is dependent on the implementation of the system 400. For example, the peripheral electronics 410 may include, but are not limited to, a display unit, one or more sensors, one or more actuators, and/or one or more user input devices.

The multi-core processor chip 401 can be implemented as the multi-core processor chip described and shown in FIG. 2 or FIG. 3. In particular, the multi-core processor chip 401 has a shared N-ported cache 405 and a plurality of processor cores 403-1 . . . 403-N which run a partitioning operating system. As described above, running the partitioning operating system on the plurality of processor cores enables the processor cores to access the shared N-ported cache without the coherency and arbitration algorithms of prior multi-core processor chips.

Executable code, such as the partitioning operating system 409 and/or other applications, is loaded into the shared cache 405 of the multi-core processor chip 401 from the main memory 416. The main memory 416 can be implemented as, but is not limited to, Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, as known to one of skill in the art. Access to the main memory 416 by each processor core is managed by its respective memory management unit (MMU) 413. The respective MMU 413, together with the partitioning operating system 409, enforce the time/space separation of the executed applications as well as the assignment of unique applications and tasks to different processor cores.

The multi-core processor chip 401 runs a plurality of applications, as described above. The applications run by the multi-core processor chip 401 are dependent on the implementation of the system 400. Improvements are thus made in the performance of system 400 by implementing a multi-core processor 401 as described above in FIGS. 2 and 3 above. For example, increased bandwidth and efficiency are achieved through the inclusion of the multi-core processor chip 401 running a partitioning operating system. In particular, the multi-core processor chip 401 manages access to a shared cache 405 without coherency or arbitration algorithms that cause decreased bandwidth and efficiency.

Figure 5:
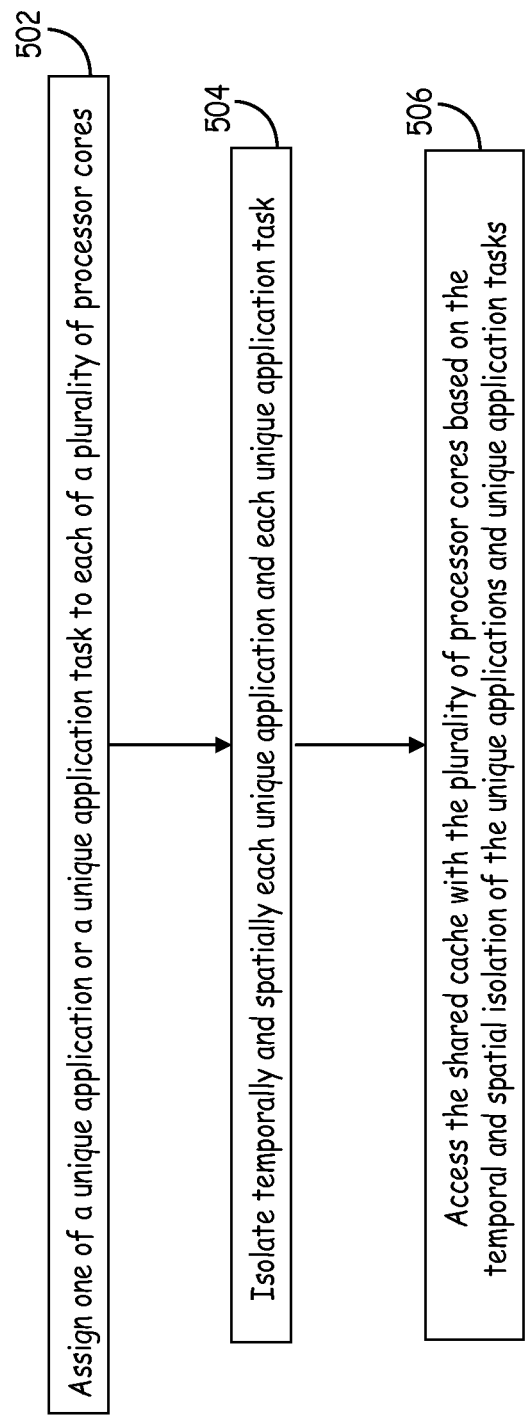
FIG. 5 is a flow chart depicting one embodiment of a method of managing a shared cache.

FIG. 5 is a flow chart depicting one embodiment of a method 500 of managing a shared cache. The method 500 can be used in managing the shared cache of FIGS. 2 and 3. At block 502, a unique application and/or a unique application task is assigned to each of the plurality of processor cores in the multi-core processor chip. Indeed, each application and application task assigned to one of the processor cores is unique.

At block 504, the unique applications and application task are isolated temporally and spatially by a partitioning operating system executed by the multi-core processor chip, as described above. For example, in some embodiments, the partitioning operating system is an ARINC 653 compliant operating system.

At block 506, a shared cache is accessed by the plurality of processor cores based on the temporal and spatial isolation of the unique applications and unique application tasks. In addition, access to the shared cache is also managed by the respective MMU of each processor core. In this example, the shared cache is a N-ported cache and each processor core accesses the shared cache via a separate port. In this way, each processor core is able to access the shared cache simultaneously with another of the plurality of processor cores. In some embodiments, the shared cache is a level 2 (L2) cache. Alternatively, the shared cache is a level 1 (L1) cache. In other implementations, the shared cache can be a level 3 (L3) cache or more than one of the L1, L2, and L3 caches can be an N-ported shared cache.

By accessing the shared cache according to the temporal and spatial isolation of the applications and tasks, each processor core does not attempt to write to the same address space of the shared cache at the same time as another of the plurality of processor cores. In other words, the multi-core processor does not need the coherency or arbitration algorithms which limit bandwidth in typical multi-core processors.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a main memory having a partitioning operating system stored thereon; and
a multi-core processor chip operable to execute the partitioning operating system, the multi-core processor chip comprising:
at least one shared cache having a plurality of ports; and
a plurality of processor cores, each processor core coupled to one of the plurality of ports such that each processor core is able to access the at least one shared cache simultaneously with another of the plurality of processor cores;
wherein the at least one shared cache has a plurality of address spaces that are accessible by each of the plurality of processor cores;
wherein each processor core is assigned one of a unique application or a unique application task and the partitioning operating system temporally and spatially isolates each unique application and each unique application task such that each of the plurality of processor cores does not attempt to write to the same address space of the at least one shared cache at the same time as another of the plurality of processor cores;
wherein at least one of the plurality of processor cores accesses one of the at least one shared cache simultaneously with another of the plurality of processor cores based on the temporal and spatial isolation of each unique application and each unique application task.

2. The system of claim 1, wherein the partitioning operating system executed by the multi-core processor chip is an ARINC 653 compliant operating system.

3. The system of claim 1, wherein the at least one shared cache is a level 2 (L2) shared cache.

4. The system of claim 3, further comprising a plurality of independent level 1 (L1) caches, each corresponding to one of the plurality of processor cores.

5. The system of claim 3, wherein the at least one shared cache further comprises a shared level 1 (L1) cache.

6. The system of claim 1, wherein each of the plurality of processor cores has access to a shared common code space in the at least one shared cache.

7. The system of claim 1, further comprising a display coupled to the multi-core processor chip, wherein the multi-core processor chip is operable to provide data to be displayed to the display.

8. The system of claim 1, further comprising a memory management unit (MMU) in each of the plurality of processor cores, each MMU operable to control access of the respective processor core to the at least one shared cache.

9. A method of managing a shared cache in a multi-core processor chip, the method comprising:
assigning one of a unique application or a unique application task to each of a plurality of processor cores in the multi-core processor chip;
isolating temporally and spatially each unique application and each unique application task from other unique applications and unique application tasks with a partitioning operating system executed by the multi-core processor chip; and
simultaneously accessing the shared cache with at least two of the plurality of processor cores based on the temporal and spatial isolation of each unique application and each unique application task without limiting each processor core to a respective assigned region of the shared cache.

10. The method of claim 9, wherein accessing the shared cache comprises accessing the shared cache via a separate port for each processor core such that each processor core is able to access the shared cache simultaneously with another of the plurality of processor cores.

11. The method of claim 9, wherein accessing the shared cache comprises accessing a shared common code space with the plurality of processor cores.

12. The method of claim 9, wherein the shared cache is a level 2 (L2) cache.

13. The method of claim 9, wherein the partitioning operating system is an ARINC 653 compliant operating system.

14. A multi-core processor chip comprising:
at least one shared cache having a plurality of ports and a plurality of address spaces; and
a plurality of processor cores, each processor core coupled to one of the plurality of ports such that each processor core is able to access the at least one shared cache simultaneously with another of the plurality of processor cores;

wherein each processor core is permitted to access each of the plurality of address spaces;

wherein each processor core is assigned one of a unique application or a unique application task; and wherein the multi-core processor chip is operable to execute a partitioning operating system that temporally and spatially isolates each unique application and each unique application task such that each of the plurality of processor cores does not attempt to write to the same address space of the at least one shared cache at the same time as another of the plurality of processor cores;

wherein at least one of the plurality of processor cores accesses one of the at least one shared cache simultaneously with another of the plurality of processor cores based on the temporal and spatial isolation of each unique application and each unique application task.

15. The multi-core processor chip of claim 14, wherein the partitioning operating system executed by the multi-core processor chip is an ARINC 653 compliant operating system.

16. The multi-core processor chip of claim 14, wherein the at least one shared cache is a level 2 (L2) shared cache.

17. The multi-core processor chip of claim 16, further comprising a plurality of independent level 1 (L1) caches, each corresponding to one of the plurality of processor cores.

18. The multi-core processor chip of claim 16, wherein the at least one shared cache further comprises a shared level 1 (L1) cache.

19. The multi-core processor chip of claim 16, wherein each of the plurality of processor cores has access to a shared common code space in the at least one shared cache.

20. The multi-core processor chip of claim 16, further comprising a memory management unit (MMU) in each of the plurality of processor cores, each MMU operable to control access of the respective processor core to the at least one shared cache.

* * * * *